(12) United States Patent
Kwon et al.

(10) Patent No.: US 9,848,442 B2
(45) Date of Patent: Dec. 19, 2017

(54) METHOD FOR TRANSMITTING AND RECEIVING FRAME IN WIRELESS LOCAL AREA NETWORK

(71) Applicant: NEWRACOM, INC., Irvine, CA (US)

(72) Inventors: Yongjin Kwon, Daejeon (KR); Hyungu Park, Daejeon (KR)

(73) Assignee: NEWRACOM INC., Irvine, CA (US)

( * ) Notice: Subject to any disclaimer, the term of this patent is extended or adjusted under 35 U.S.C. 154(b) by 76 days.

(21) Appl. No.: 14/937,284

(22) Filed: Nov. 10, 2015

(65) Prior Publication Data
US 2016/0135225 A1 May 12, 2016

Related U.S. Application Data

(60) Provisional application No. 62/077,771, filed on Nov. 10, 2014.

(51) Int. Cl.
*H04W 74/08* (2009.01)
*H04W 84/12* (2009.01)

(52) U.S. Cl.
CPC ..... *H04W 74/0808* (2013.01); *H04W 74/085* (2013.01); *H04W 74/0816* (2013.01); *H04W 84/12* (2013.01)

(58) Field of Classification Search
CPC ......... H04W 74/0808; H04W 74/0816; H04W 74/085; H04W 74/0883; H04W 74/0891; H04W 84/12
See application file for complete search history.

(56) References Cited

U.S. PATENT DOCUMENTS

2014/0269524 A1* 9/2014 Xiao ................. H04W 74/0825
370/329
2015/0078299 A1* 3/2015 Barriac ............... H04W 74/006
370/329

* cited by examiner

*Primary Examiner* — Khoa Huynh

(57) ABSTRACT

Disclosed are methods and apparatuses for transmitting and receiving a frame in a WLAN. A method for transmitting a frame, performed in a first station, may comprise receiving a first PPDU; determining whether a BSS of the first PPDU is a BSS to which the first station belongs or a BSS to which the first station does not belong; when the BSS of the first PPDU is the BSS to which the first station does not belong and a received signal strength of the first PPDU is higher than a first threshold, setting a virtual carrier sensing by using information included in a preamble of the first PPDU. Therefore, performance of the WLAN can be enhanced.

14 Claims, 9 Drawing Sheets

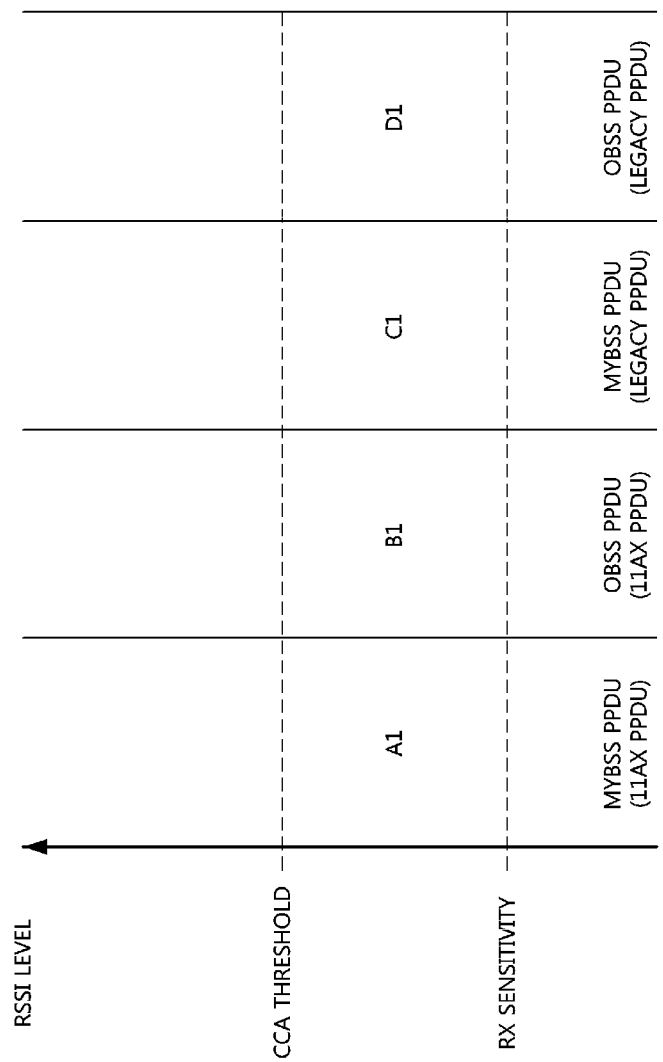

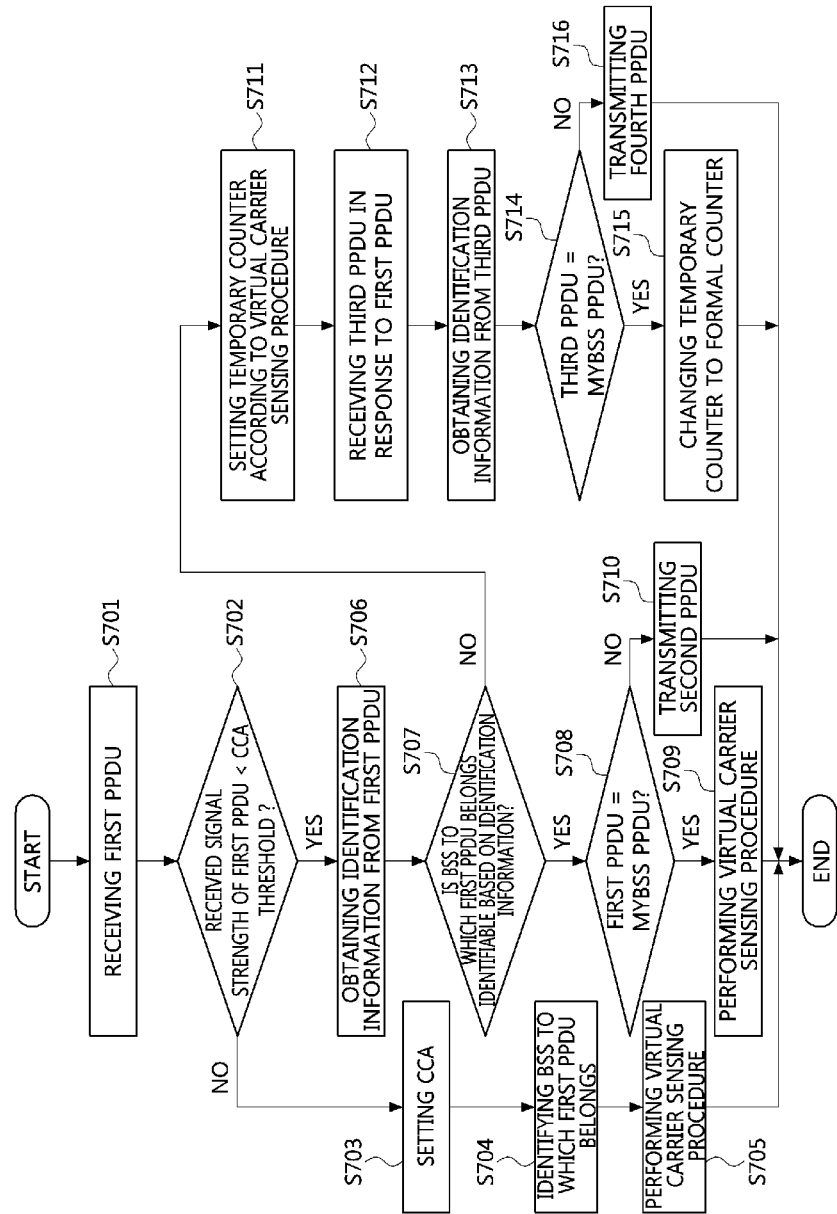

METHOD FOR TRANSMITTING AND RECEIVING FRAME IN WIRELESS LOCAL AREA NETWORK

CROSS-REFERENCE TO RELATED APPLICATIONS

This application claims priority to U.S. Patent Application No. 62/077,771 filed on Nov. 10, 2014, and the entire contents of which are hereby incorporated by reference.

BACKGROUND

1. Technical Field

The present disclosure relates to a wireless local area network (WLAN) technology, and more particularly to methods for transmitting and receiving a frame in an overlapping basic service set (OBSS) environment.

2. Related Art

With the development of information communication technologies, a variety of wireless communication technologies have been developed. Among these technologies, wireless local area network (WLAN) is a technology that Internet access is possible in a wireless way in homes, business or specific service providing areas, using portable terminal such as personal digital assistant (PDA), a laptop computer, a portable multimedia player (PMP), or the like, based on wireless frequency technologies.

WLAN technologies are created and standardized by the IEEE 802.11 Working Group under IEEE 802 Standard Committee. As such WLAN technology becomes more prevalent and its applications become more diverse, there is increasing demand for new WLAN technology that can support a higher throughput than existing WLAN technologies. Very high throughput (VHT) WLAN technology is proposed to support a data rate of 1 Gbps and higher. A WLAN technology according to IEEE 802.11ac standard is a technology providing VHT in sub 6 GHz band, and A WLAN technology according to IEEE 802.11ad standard is a technology providing VHT in 60 GHz band.

In addition to the above-described standards, various standards on WLAN technologies have been developed, and are being developed. As representative recent technologies, a WLAN technology according to IEEE 802.11af standard is a technology which has been developed for WLAN operation in TV white space bands, and a WLAN technology according to IEEE 802.11ah standard is a technology which has been developed for supporting a great number of stations operating with low power in sub 1 GHz band, and a WLAN technology according to IEEE 802.11ai standard is a technology which has been developed for supporting fast initial link setup (FILS) in WLAN systems. Also, IEEE 802.11ax standard is being developed for enhancing frequency efficiency of dense environments in which numerous access points and stations exist.

In the system based on such the WLAN technologies, even in a situation in which a communication entity can transmit a frame, the communication entity may lose its transmission opportunity due to a frame transmitted by another communication entity belonging to an overlapping basic service set (OBSS).

SUMMARY

Accordingly, exemplary embodiments of the present disclosure are provided to substantially obviate one or more problems due to limitations and disadvantages of the related art. Exemplary embodiments of the present disclosure provide methods and apparatuses for transmitting and receiving a frame in the OBSS environment.

In order to achieve the objectives of the present disclosure, a method for transmitting a frame, performed in a first station, comprises receiving a first physical layer convergence procedure protocol data unit (PPDU); determining whether a basic service set (BSS) of the first PPDU is a BSS to which the first station belongs or a BSS to which the first station does not belong; when the BSS of the first PPDU is the BSS to which the first station does not belong and a received signal strength of the first PPDU is higher than a first threshold, setting a virtual carrier sensing by using information included in a preamble of the first PPDU; and when the BSS of the first PPDU is the BSS to which the first station does not belong and the received signal strength of the first PPDU is lower than the first threshold, trying to obtain a transmission opportunity.

In addition, the method may further comprises, when the BSS of the first PPDU is the BSS to which the first station belongs, setting a virtual carrier sensing by using information included in the preamble of the first PPDU.

Here, the BSS of the first PPDU may be determined based on at least one of a BSS identifier (BSSID), a transmitter address, a receiver address, and a version information included in the first PPDU.

Here, the first threshold may be a clear channel assessment (CCA) threshold.

Here, the first threshold may be different from a threshold which is used for determining reception possibility of the first PPDU when the BSS of the first PPDU is the BSS to which the first station belongs.

Here, the information included in the preamble of the first PPDU may indicate a duration which is set for the virtual carrier sensing.

Here, the trying to obtain the transmission priority may be performed without set of the virtual carrier sensing.

In order to achieve the objectives of the present disclosure, a station comprises a processor; and a memory storing at least one instruction executed by the processor, wherein the at least one instruction: receiving a first physical layer convergence procedure protocol data unit (PPDU); determining whether a basic service set (BSS) of the first PPDU is a BSS to which the first station belongs or a BSS to which the first station does not belong; when the BSS of the first PPDU is the BSS to which the first station does not belong and a received signal strength of the first PPDU is higher than a first threshold, setting a virtual carrier sensing by using information included in a preamble of the first PPDU; and when the BSS of the first PPDU is the BSS to which the first station does not belong and the received signal strength of the first PPDU is lower than the first threshold, trying to obtain a transmission opportunity.

In addition, the at least one instruction may further execute, when the BSS of the first PPDU is the BSS to which the first station belongs, setting the virtual carrier sensing by using information included in the preamble of the first PPDU.

Here, the BSS of the first PPDU may be determined based on at least one of a BSS identifier (BSSID), a transmitter address, a receiver address, and a version information included in the first PPDU.

Here, the first threshold may be a clear channel assessment (CCA) threshold.

Here, the first threshold may be different from a threshold which is used for determining reception possibility of the first PPDU when the BSS of the first PPDU is the BSS to which the first station belongs.

Here, the information included in the preamble of the first PPDU may indicate a duration which is set for the virtual carrier sensing.

Here, the trying to obtain the transmission priority may be performed without set of the virtual carrier sensing.

According to exemplary embodiments, the station receiving the first PPDU can identify whether the first PPDU is transmitted from a BSS to which the station belongs or an OBSS. In a case that the first PPDU is transmitted from the BSS to which the station belongs, the station may perform a virtual carrier sensing procedure. On the contrary, in a case that the first PPDU is transmitted from the OBSS, the station may obtain a transmission opportunity.

Meanwhile, if the station does not identify the BSS from which the first PPDU is transmitted, the station may set a temporary counter based on a virtual carrier sensing procedure, and receive a second PPDU in response to the first PPDU. Also, the station may identify whether the second PPDU is transmitted from the BSS to which the station belongs or the OBSS based on information included in the second PPDU. If the second PPDU is a PPDU transmitted from the BSS to which the station belongs, the station may change the temporary counter to a formal counter based on a virtual carrier sensing procedure. On the contrary, if the second PPDU is a PPDU transmitted from an OBSS, the station may obtain a transmission opportunity.

Therefore, the station can obtain more transmission opportunities, and efficiently utilize radio channels. Also, the station can easily obtain a transmission opportunity even in an environment where stations are deployed densely. Therefore, performance of WLAN can be enhanced.

BRIEF DESCRIPTION OF DRAWINGS

Exemplary embodiments of the present disclosure will become more apparent by describing in detail exemplary embodiments of the present disclosure with reference to the accompanying drawings, in which:

FIG. 6 is a conceptual diagram illustrating cases in which a PPDU can be transmitted;

FIG. 7 is a flow chart illustrating a method for transmitting a frame according to an exemplary embodiment of the present disclosure;

DETAILED DESCRIPTION

Figure 1:
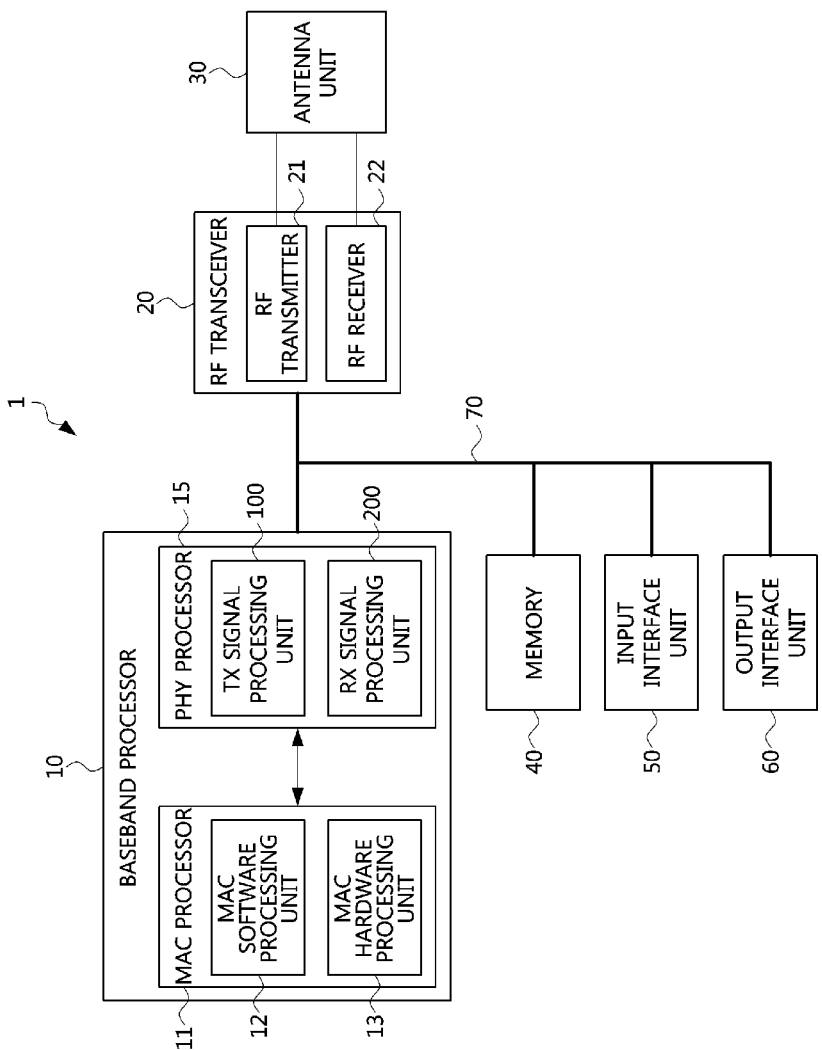
FIG. 1 is a block diagram illustrating a structure of a WLAN device according to an embodiment.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to IEEE (Institute of Electrical and Electronics Engineers) 802.11 standard. In the plurality of WLAN devices, at least one WLAN device may be an access point and the other WLAN devices may be non-AP stations (non-AP STAs). Alternatively, all of the plurality of WLAN devices may be non-AP STAs in Ad-hoc networking. In general, the AP STA and the non-AP STAs may be collectively called the STA. However, for ease of description herein, only the non-AP STAs are referred to as the STAs.

FIG. 1 is a block diagram illustrating a structure of a WLAN device according to an embodiment.

Referring to FIG. 1, the WLAN device 1 may include a baseband processor 10, a radio frequency (RF) transceiver 20, an antenna unit 30, a memory 40, an input interface unit 50, an output interface unit 60, and a bus 70. The baseband processor 10 may perform baseband signal processing, and may include a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, embodiments of the MAC processor 11 are not limited to this. The PHY processor 15 may include a transmitting (Tx) signal processing unit 100 and a receiving (Rx) signal processing unit 200.

The baseband processor 10, the memory 40, the input interface unit 50, and the output interface unit 60 may communicate with each other via the bus 70. The RF transceiver 20 may include an RF transmitter 21 and an RF receiver 22. The memory may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
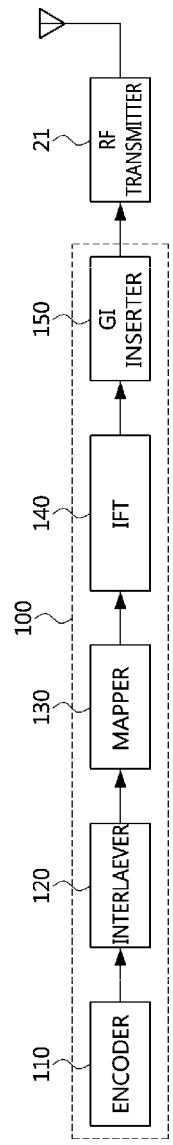
FIG. 2 is a schematic block diagram illustrating a transmitting signal processing unit 100 according to an embodiment suitable for use in a WLAN.

FIG. 2 is a schematic block diagram illustrating a transmitting signal processing unit 100 according to an embodiment suitable for use in a WLAN.

Referring to FIG. 2, a transmitting signal processing unit 100 may include an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change an order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers 130 corresponding to a number of spatial streams Nss. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the NSS spatial streams into NSTS space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper. When the MU-MIMO is used, some blocks before the spatial mapper may be provided for each user.

The GI inserter 150 prepends a guard interval (GI) to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
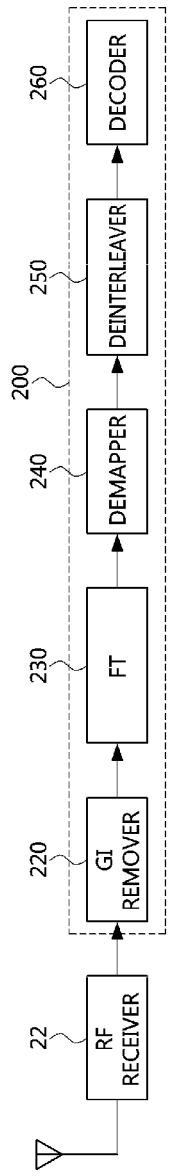
FIG. 3 is a schematic block diagram of a receiving signal processing unit according to an embodiment suitable for use in the WLAN.

FIG. 3 is a schematic block diagram of a receiving signal processing unit according to an embodiment suitable for use in the WLAN.

Referring to FIG. 3, a receiving signal processing unit 200 may include a GI remover 220, a Fourier transformer (FT) 230, a demapper 240, a deinterleaver 250, and a decoder 260. An RF receiver 22 receives an RF signal via the antenna unit 30 and converts the RF signal into a symbol. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain. When the MIMO or the MU-MIMO is used, the receiving signal processing unit 200 may include a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder 260, the receiving signal processing unit 100 may not use the encoder deparser.

Figure 4:
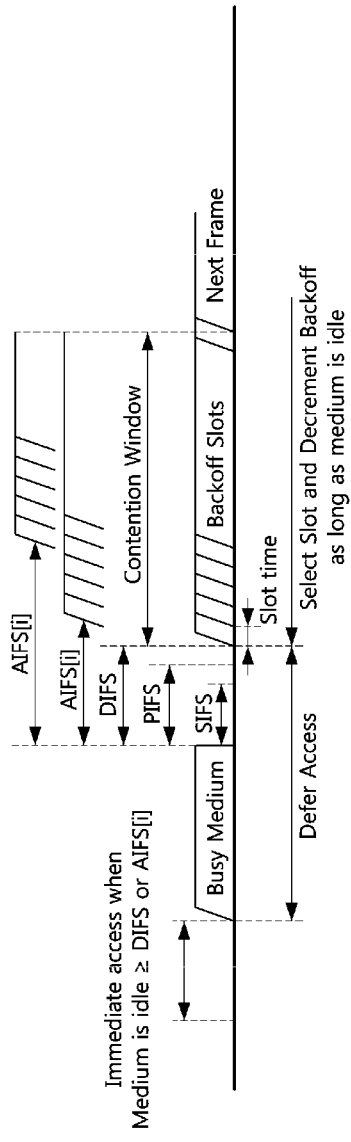
FIG. 4 illustrates interframe space (IFS) relationships.

FIG. 4 illustrates interframe space (IFS) relationships.

Referring to FIG. 4, a data frame, a control frame, or a management frame may be exchanged between WLAN devices. The data frame is used for transmission of data forwarded to a higher layer. The WLAN device transmits the data frame after performing backoff if a distributed coordination function IFS (DIFS) has elapsed from a time when the medium has been idle.

The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. When the control frame is not a response frame of a previous frame, the WLAN device transmits the control frame after performing backoff when the DIFS has elapsed. When the control frame is the response frame of the previous frame, the WLAN device transmits the control frame without performing backoff when a short IFS (SIFS) has elapsed. The type and subtype of frame may be identified by a type field and a subtype field in a frame control field.

On the other hand, a Quality of Service (QoS) STA may transmit the frame after performing backoff when an arbitration IFS (AIFS) for access category (AC), i.e., AIFS[AC] has elapsed. In this case, the data frame, the management frame, or the control frame which is not the response frame may use the AIFS[AC].

Figure 5:
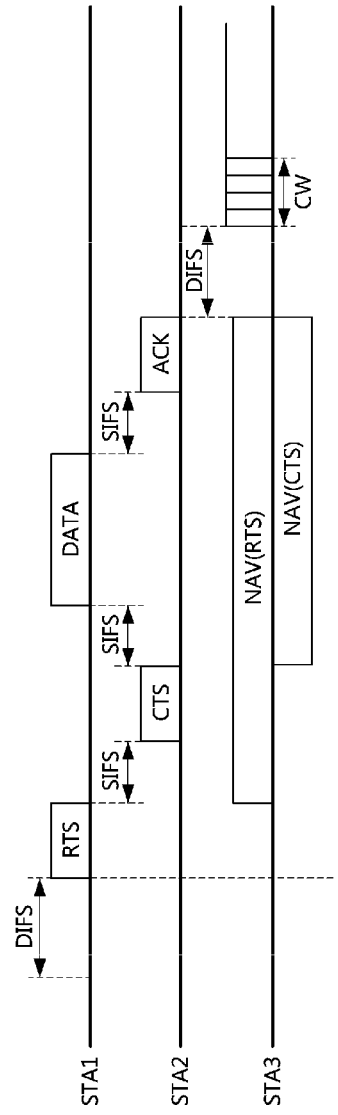
FIG. 5 is a timing diagram illustrating a frame transmission procedure based on a CSMA (carrier sense multiple access)/CA (collision avoidance) manner for avoiding collision between frames in a channel.
Figure 8A:
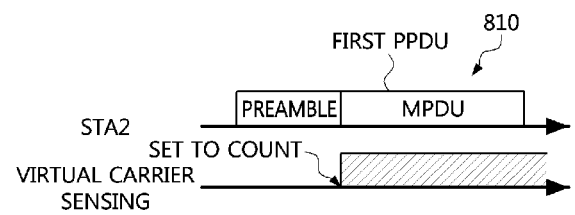
FIGS. 8A to 8E are timing diagrams illustrating exemplary embodiments of durations for which a frame can be transmitted.
Figure 8B:
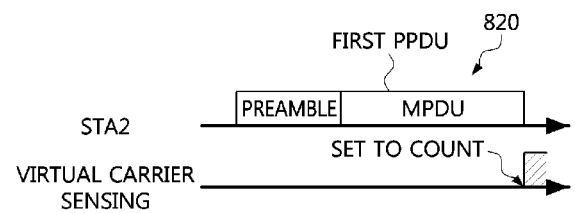
Figure 8C:
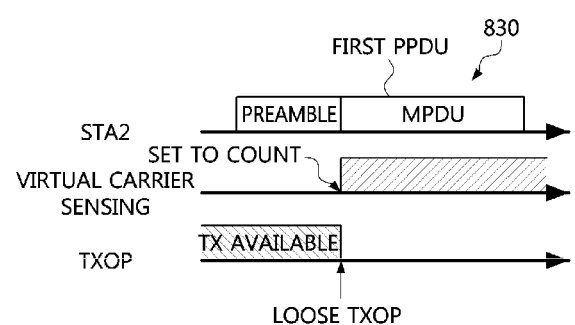
Figure 8D:
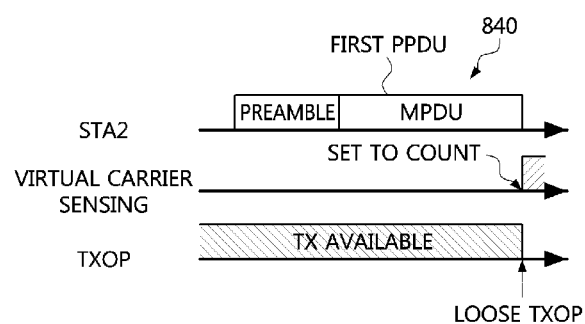
Figure 8E:
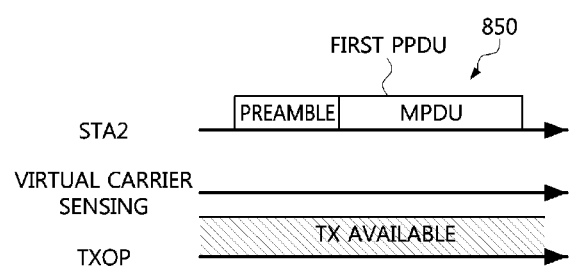

FIG. 5 is a timing drawing illustrating a frame transmission procedure based on a CSMA (carrier sense multiple access)/CA (collision avoidance) manner for avoiding collision between frames in a channel.

Referring to FIG. 5, STA1 is a transmit WLAN device for transmitting data, STA2 is a receive WLAN device for receiving the data, and STA3 is a third WLAN device which may be located at an area where a frame transmitted from the STA1 and/or a frame transmitted from the STA2 can be received by the third WLAN device STA3.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When it is determined that the channel is not in use by other devices during DIFS (that is, the channel is idle), the STA1 may transmit an RTS frame to the STA2 after performing backoff Upon receiving the RTS frame, the STA2 may transmit a CTS frame as a response of the CTS frame after a SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the CTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after a SIFS elapses from a time when the CTS frame has been completely received. Upon successfully receiving the data frame, the STA2 may transmit an ACK frame as a response of the data frame after a SIFS elapses.

When the NAV timer expires, the STA3 may determine whether the channel is busy by the carrier sensing. Upon determining that the channel is not in use by the other devices during DIFS after the NAV timer has expired, the STA3 may attempt the channel access after a contention window according to random backoff operation.

FIG. 6 is a conceptual diagram illustrating cases in which a PPDU can be transmitted.

Referring to FIG. 6, a reception sensitivity (RX sensitivity) may be set as a value less than a clear channel assessment (CCA) threshold. Also, according to an exemplary embodiment, the RX sensitivity may be set identically to the CCA threshold. Also, a CCA threshold for a 'MyBSS' may be set differently from a CCA threshold for an overlapping BSS (OBSS). Here, the 'MyBSS' may be a BSS to which the first station STA1 belongs, and the OBSS may be a BSS overlapping with the BSS to which the STA1 belongs. When a received signal strength (i.e., a received signal strength indicator (RSSI) level) of a physical layer convergence procedure protocol data unit (PPDU) is equal to or higher than the RX sensitivity, the STA1 can receive the PPDU. Also, when the received signal strength of the PPDU is equal to or higher than the CCA threshold, the STA1 may determine that a channel on which the CCA is performed is busy.

In a case that a PPDU transmitted by a station belonging to MyBSS is a PPDU specified in the IEEE 802.11ax (i.e., 11ax PPDU) and a received signal strength of the PPDU is equal to or higher than the RX sensitivity and equal to or lower than the CCA threshold (i.e., A1 region), since collisions between PPDUs can occur when the STA1 transmits a PPDU, the STA1 may not obtain a transmission opportunity (TxOP). In a case that a PPDU transmitted by a station belonging to OBSS is an 11ax PPDU and a received signal strength of the PPDU is equal to or higher than the RX sensitivity and equal to or lower than the CCA threshold (i.e., B1 region), since possibility of collisions between PPDUs is low when the STA1 transmits a PPDU, the STA1 may obtain a transmission opportunity.

In a case that a PPDU transmitted by a station belonging to MyBSS is a legacy PPDU (i.e., a PPDU specified by versions earlier than the IEEE 802.11ax) and a received signal strength of the PPDU is equal to or higher than the RX sensitivity and equal to or lower than the CCA threshold (i.e., C1 region), since collisions between PPDUs can occur when the STA1 transmits a PPDU, the STA1 may not obtain a transmission opportunity. Also, in a case that a PPDU transmitted by a station belonging to OBSS is a legacy frame and a received signal strength of the PPDU is equal to or higher than the RX sensitivity and equal to or lower than the CCA threshold (i.e., a D1 region), since possibility of collisions between PPDUs is low when the STA1 transmits a PPDU, the STA1 may obtain a transmission opportunity.

Therefore, in order to enhance transmission efficiency in WLAN, it may be permitted to obtain transmission opportunities in the B1 region and the D1 region. For this, the STA1 should identify a region (e.g., A1, B1, C1, or D1) to which a received PPDU belongs. However, if the received PPDU is a legacy PPDU, it is not easy to identify the region (e.g., C1 region or D1 region) to which the received PPDU belongs.

Figure 9:
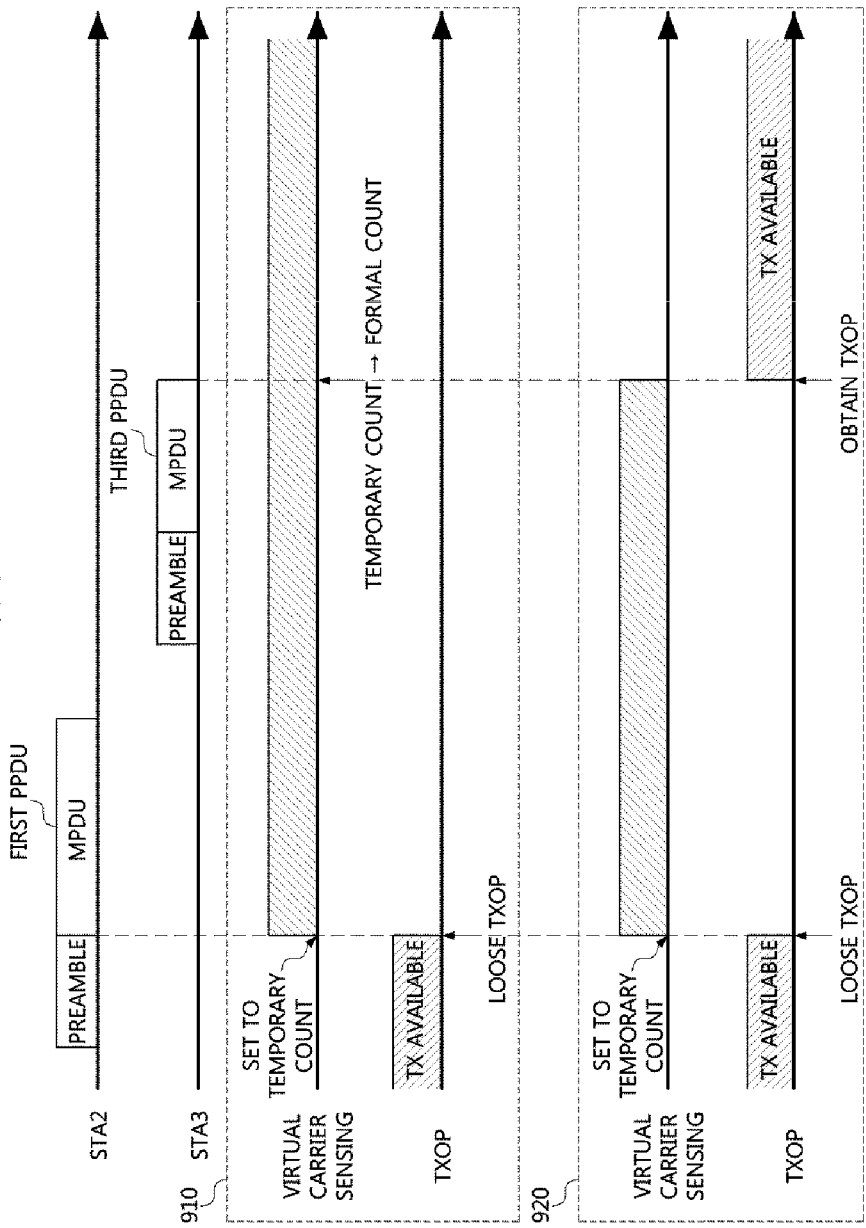
FIG. 9 is timing diagram illustrating other exemplary embodiments of durations for which a frame can be transmitted.

FIG. 7 is a flow chart illustrating a method for transmitting a frame according to an exemplary embodiment of the present disclosure, FIGS. 8A to 8E are timing diagrams illustrating exemplary embodiments of durations for which a frame can be transmitted, and FIG. 9 is timing diagram illustrating other exemplary embodiments of durations for which a frame can be transmitted.

Referring to FIG. 7, FIGS. 8A to 8E, and FIG. 9, the STA1 may receive a first PPDU transmitted by the STA2 (S701). That is, when a received signal strength of the first PPDU is equal to or higher than the RX sensitivity, the STA1 can receive the first PPDU. The BSS to which the STA1 belongs may be identical to the BSS to which the STA2 belongs or may be a BSS (i.e. OBSS) overlapping the BSS to which the STA2 belongs. The STA1 may determine whether a received signal strength of the first PPDU is equal to or lower than the CCA threshold (S702). Here, the CCA threshold for MyBSS may be set differently from the CCA threshold for OBSS.

In a case that the received signal strength of the first PPDU is equal to or higher than the CCA threshold, the STA1 may perform a CCA procedure (S703). That is, a PHY processor of the STA1 may transmit a CCA indication indicating that a channel is busy to a MAC processor. Then, the MAC processor may determine that the channel is busy if it receives the CCA indication for a CCA time.

Then, the STA1 may determine whether the BSS of the first PPDU is MyBSS or OBSS (S704). For example, the STA1 may obtain, from the first PPDU, identification information indicating a BSS (i.e., a BSS to which a station transmitting or receiving the first PPDU belongs) from which the first PPDU is transmitted, and identify the BSS of the first PPDU based on the identification information. The identification information may include at least one of a color bit, a BSS identifier (BSSID), a transmitter address, a receiver address, and a version information.

The color bit may be a color bit defined in the IEEE 802.11ah, and be included in a signal field of the first PPDU. The STA1 may obtain the color bit from the signal field of the first PPDU, and identify the BSS of the first PPDU based on the color bit. The BSSID, the transmitter address, and the receiver address may be included in a MAC header of the first PPDU. The STA1 may obtain at least one of the BSSID, the transmitter address, and the receiver address from the MAC header of the first PPDU, and determine that the BSS of the first PPDU is MyBSS when an access point indicated by the obtained information is same as an access point with which the STA1 is associated. On the contrary, when the access point indicated by the obtained information is different from the access point with which the STA1 is associated, the STA1 may determine the BSS of the first PPDU as an OBSS. The version information may indicate a WLAN version (e.g., non-HT, HT, VHT, HE, etc.) supported by the STA2 transmitting the first PPDU, and be included in the preamble or the MAC header of the first PPDU. The STA1 may obtain the version information from the preamble or MAC header of the first PPDU, and determine the BSS of the first PPDU as an OBSS when the obtained version information indicates that the STA2 supports HT or VHT.

On the basis of information included in the first PPDU, a virtual carrier sensing may be performed (S705). The virtual carrier sensing may be classified into a PHY-level virtual carrier sensing, a MAC-level virtual carrier sensing, etc. The PHY-level virtual carrier sensing may be performed based on information included in the preamble of the first PPDU (e.g., a response indication parameter (RESPONSE_INDICATION parameter), a duration field, etc.). Also, the MAC-level virtual carrier sensing may be performed based on information included in the MAC header of the first PPDU (e.g., a duration field, etc.).

In a case that the first PPDU is an 11ax PPDU and the BSS of the first PPDU is MyBSS (e.g., an A2 region in FIG. 10 to be explained later), the STA1 may perform the PHY-level virtual carrier sensing based on the information included in the preamble of the first PPDU. For example, the STA1 may set to count according to a response indication deferral (RID) or the duration field for the PHY-level virtual carrier sensing. The STA1 may set to count after the preamble of the first PPDU as illustrated in a timing diagram of FIG. 8A or after the end of the first PPDU as illustrated in a timing diagram of FIG. 8B. If the first PPDU belongs to the A2 region, the STA1 may perform the MAC-level virtual carrier sensing based on the information included in the MAC header of the first PPDU. For example, the STA1 may set a NAV based counter based on the information indicated by the duration field included in the MAC header of the first PPDU. The NAV based counter may be set after the end of the first PPDU as illustrated in the timing diagram of FIG. 8B.

In a case that the first PPDU is an 11ax PPDU and the BSS of the first PPDU is MyBSS (e.g., a B2 region in FIG. 10 to be explained later), the STA1 may perform the PHY-level virtual carrier sensing based on the information included in the preamble of the first PPDU.

In a case that the first PPDU is a legacy PPDU and the BSS of the first PPDU is MyBSS (e.g., a C2 region in FIG. 10 to be explained later), the STA1 may perform the MAC-level virtual carrier sensing based on the information included in the MAC header of the first PPDU. In a case that the first PPDU is a legacy PPDU and the BSS of the first PPDU is OBSS (e.g., a D2 region in FIG. 10 to be explained later), the STA1 may perform the MAC-level virtual carrier sensing based on the information included in the MAC header of the first PPDU. In a case that the first PPDU is a legacy PPDU and the BSS of the first PPDU is not identifiable (e.g., an E2 region in FIG. 10 to be explained later), the STA1 may perform the MAC-level virtual carrier sensing based on the information included in the MAC header of the first PPDU.

Meanwhile, in a case that a received signal strength of the first PPDU is equal to or lower than the CCA threshold, the STA1 may obtain identification information indicating a BSS from which the first PPDU is transmitted (i.e., a BSS to which a station transmitting or receiving the first PPDU belongs) from the first PPDU (S706). The identification information may be identical to those explained in the step S704.

The STA1 may determine whether the BSS from which the first PPDU is transmitted is identifiable or not based on the identification information of the first PPDU (S707). When the BSS from which the first PPDU is transmitted is identifiable based on the identification information of the first PPDU, the STA1 may determine whether the first PPDU is transmitted from the BSS to which the STA1 belongs (i.e., MyBSS) (S708). In the case that the first PPDU is an 11ax PPDU, the STA1 may identify the BSS from which the first PPDU is transmitted by using at least one of a color bit, a BSSID, a transmitter address, a receiver address, and a version information included in the first PPDU. In cases that the first PPDU is a non-HT PPDU, a HT PPDU, or a VHT PPDU, the STA1 may identify the BSS from which the first PPDU is transmitted by using at least one of a BSSID, a transmitter address, a receiver address, and a version information included in the first PPDU.

In the case that the BSS from which the first PPDU is transmitted is the BSS to which the STA1 belongs, the STA1 may perform a virtual carrier sensing (S709). The STA1 may additionally perform a CCA before performing the virtual carrier sensing. In the case that first PPDU is an 11ax PPDU (e.g., the A1 region of FIG. 10 to be explained later), the STA1 may perform the PHY-level virtual carrier sensing or the MAC-level virtual carrier sensing. When the PHY-level virtual carrier sensing is performed, the STA1 may obtain a transmission opportunity (TxOP) until the end point of the preamble of the first PPDU as illustrated in a timing diagram of FIG. 8C. However, the STA1 may lose the transmission opportunity after the preamble of the first PPDU. The STA1 may obtain a transmission opportunity until the end point of the first PPDU as illustrated in a timing diagram of FIG. 8D. However, the STA1 may lose the transmission opportunity after the first PPDU. When the MAC-level virtual carrier sensing is performed, the STA1 may obtain a transmission opportunity until the end of the first PPDU as illustrated in the timing diagram of FIG. 8D. However, the STA1 may lose the transmission opportunity after the first PPDU.

In the case that the first PPDU is a legacy PPDU (e.g., the C1 region of FIG. 10 to be explained later), the STA1 may perform the MAC-level virtual carrier sensing. For example, the STA1 may obtain a transmission opportunity until the end point of the first PPDU as illustrated in the timing diagram of FIG. 8D. However, the STA1 may lose the transmission opportunity after the first PPDU.

That is, in the case that the BSS from which the first PPDU is transmitted is the BSS to which the STA1 belongs, since collisions between PPDUs can occur when the STA1 transmits a PPDU, the STA1 may not obtain a transmission opportunity.

On the contrary, in the case that the BSS from which the first PPDU is transmitted is OBSS (e.g., the B1 region or D1 region of FIG. 10 to be explained later), the STA1 may not lose a transmission opportunity, and accordingly can transmit a second PPDU (S710). That is, since the virtual carrier sensing is not performed as illustrated in a timing diagram of FIG. 8E, the STA1 may not lose the transmission opportunity.

Meanwhile, in the case that the BSS from which the first PPDU is transmitted is not identifiable based on the identification information of the first PPDU (e.g., the E1 region of FIG. 10), the STA1 may set a temporary counter according to a virtual carrier sensing based on the information included in the first PPDU (S711). For example, in a case that the first PPDU is a CTS frame in response to a RTS frame, since the CTS frame includes only a receiver address among a transmitter address and a receiver address, the STA1 may not identify the BSS from which the first PPDU is transmitted. Although the STA1 may obtain a transmission opportunity until the end of the preamble of the first PPDU as illustrated in a timing diagram of FIG. 9, the STA1 may lose the transmission opportunity from a time point when the temporary counter is set. Here, the temporary counter may be changed to a formal counter, reset to 0, or canceled according to a BSS from which a third PPDU in response to the first PPDU is transmitted. The formal counter may be a counter which is set based on a virtual carrier sensing procedure defined in the IEEE 802.11.

Then, the STA1 may receive the third PPDU in response to the first PPDU (S712). For example, if the first PPDU is a CTS frame in response to a RTS frame, the third PPDU may be a data frame in response to the CTS frame. The STA1 may obtain identification information indicating a BSS from which the third PPDU is transmitted from the third PPDU (S713), and identify whether the third PPDU is transmitted from the BSS to which the STA1 belongs based on the obtained identification information (S714). That is, in the case that the BSS from which the current PPDU is transmitted is not identifiable based on the identification information of the current PPDU, the STA1 can identify the BSS from which the current PPDU is transmitted based on identification information of a PPDU subsequent to the current PPDU.

In the case that the BSS from which the third PPDU is transmitted is the BSS to which the STA1 belongs, the STA1 may change the temporary counter to a formal counter (e.g., a counter based on a MAC-level virtual carrier sensing procedure) based on the information included in the first PPDU or the third PPDU (S715). That is, as illustrated in the timing diagram of FIG. 9, the STA1 may change the temporary counter to the formal counter at the end point of the third PPDU (or, at the end point of the preamble of the third PPDU). On the contrary, in the case that the BSS from which the third PPDU is transmitted is OBSS, the STA1 may obtain a transmission opportunity, and accordingly can transmit the fourth PPDU (S716). That is, as illustrated in the timing diagram of FIG. 9, the STA1 may cancel the temporary counter or set the temporary counter as 0 at the end point of the third PPDU (or, at the end point of the preamble of the third PPDU), and accordingly can obtain a transmission opportunity.

Figure 10:
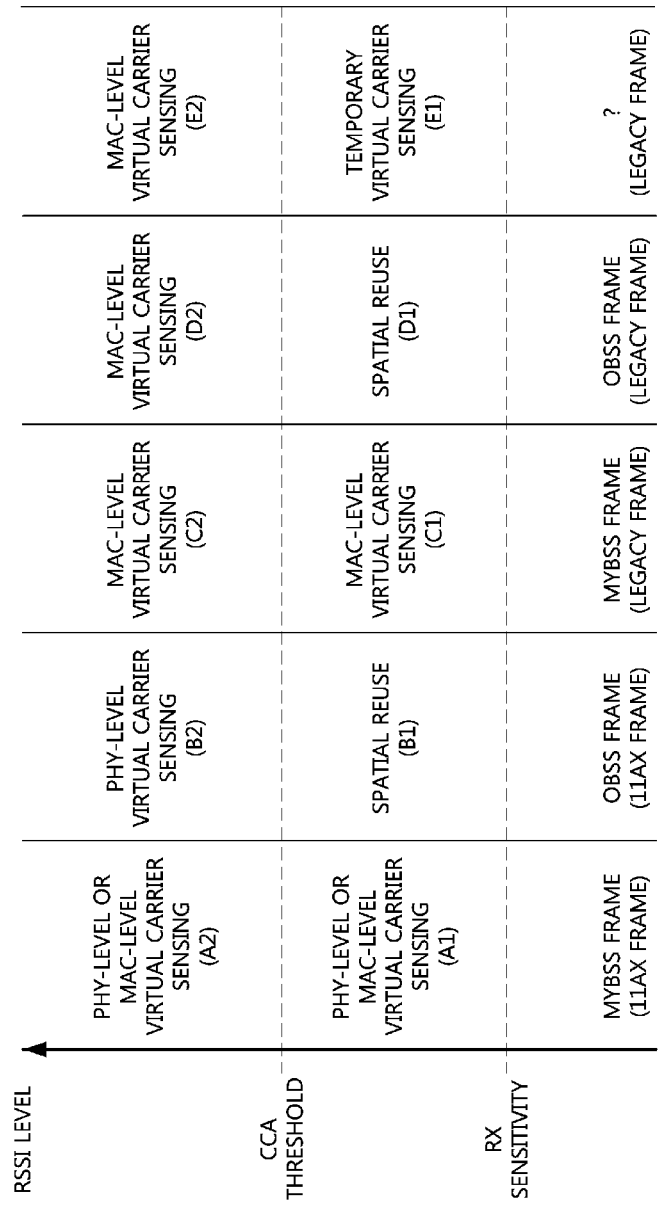
FIG. 10 is a diagram to explain a method for controlling transmission opportunities of a WLAN device according to an exemplary embodiment of the present disclosure.

FIG. 10 is a diagram to explain a method for controlling transmission opportunities of a WLAN device according to an exemplary embodiment of the present disclosure. Although the CCA thresholds for OBSS and MyBSS are illustrated as identical, they may be different from each other. Especially, the CCA threshold for OBSS may be higher than the CCA threshold for MyBSS.

A PHY header (e.g., a preamble) of a frame defined in the IEEE 802.11ax (hereinafter, referred to as '11ax frame' or 'HE frame') may include BSS identification information (field) such as a BSS color field (or, a color bit) and information (field) for setting a duration for a virtual carrier sensing. Here, a frame may be a PPDU which has been explained. In the present description, the 11 ax frame may include a frame according to versions after the IEEE 802.11ax. A PHY header of a legacy frame (e.g., a non-HT frame, a HT frame, a VHT frame, etc.) does not include a BSS color field and information (field) for setting a duration for a virtual carrier sensing.

The fact that a received signal strength of a received frame is lower than a RX sensitivity may mean that a station cannot receive a frame having a valid PHY header. Also, the fact that a received signal strength of a received frame is higher than a RX sensitivity may mean that a station can receive a frame having a valid PHY header.

The set of the PHY-level virtual carrier sensing performed by a station may mean that the station sets a duration for the virtual carrier sensing by using information (field) of a valid PHY header. Also, the set of the MAC-level virtual carrier sensing performed by a station may mean that the station sets a duration for the virtual carrier sensing by using information (duration/ID field) of a MAC header in a MAC PDU (MPDU). The duration for the virtual carrier sensing may mean a duration in which a station deems a channel as busy regardless of a received signal strength.

If the received signal strength of the received frame is lower than the RX sensitivity, the station may obtain a transmission opportunity.

If the received signal strength of the received frame is higher than the RX sensitivity, the station may obtain a valid PHY header and MAC header from the received frame, and identify version information of the received frame. For example, the station may identify the received frame as one of a non-HT frame, a HT frame, a VHT frame, and a HE frame (11ax frame).

The MAC headers of the non-HT frame, the HT frame, the VHT frame, and the HE frame may include a MAC address. Especially, they may include at least one of a transmitter address (TA) and a receiver address (RA).

Also, the station may identify a BSS of the received frame based on version information of at least one of the PHY header, the MAC header, and the received frame. Also, a case that the BSS of the received frame cannot be identified even though the version information of the PHY header, the MAC header, and the received frame is used may exist.

For example, if the received frame is an 11ax frame and the PHY header of the received frame has BSS identification information such as a BSS color field, the station may identify whether the received frame is a MyBSS frame or an OBSS frame based on the PHY header, specifically based on the BSS identification information of the PHY header.

If the received frame is not an 11ax frame and the PHY header of the received frame does not have BSS identification information, the station may identify whether the received frame is a MyBSS frame or an OBSS frame by using the MAC address of the MAC header of the received frame. For example, if the MAC header of the received frame includes both a TA address and a RA address, the HE station may compare a BSSID of its access point with the TA and RA of the received frame, and determine that the received frame is a MyBSS frame when at least one of the TA and RA coincides with the BSSID of its access point. The HE station may determine that the received frame is an OBSS frame when any one of the TA and RA does not coincide with the BSSID of its access point. However, since a frame such as a CTS frame has only a RA, the HE station cannot identify whether the received frame is a MyBSS frame or an OBSS frame, for all non-HE frames.

In order to identify whether the received frame is a MyBSS frame or not, the HE station may also use a version of the received frame. When the PHY header of the received frame does not have BSS identification information and the received frame is a HT frame or a VHT frame, the HE station may determine that the received frame is an OBSS frame.

If the PHY header of the received frame does not have BSS identification information and the received frame is a non-HT frame, the HE station may not determine whether the received frame is a MyBSS frame or an OBSS frame with easiness. The reason is that the HE station also uses non-HT control frames such as a RTS frame and a CTS frame. As described above, in the case that a non-HT frame such as a RTS frame has both a TA address and a RA address, it can be determined whether the received frame is a MyBSS frame or an OBSS frame. However, since a frame such as a CTS frame has not a TA but a RA, the HE station cannot identify whether the received frame is a MyBSS frame or an OBSS frame for all non-HE frames.

If the received frame is an 11ax frame and a MyBSS frame, and the received signal strength of the received frame is higher than the RX sensitivity and lower than the CCA threshold for MyBSS, the station may not obtain a transmission opportunity, and may set a PHY-level virtual carrier sensing or a MAC-level virtual carrier sensing (A1 region). Since the received frame is an 11ax frame, the HE station may easily identify whether the received frame is a MyBSS frame based on the BSS color field of the PHY header. In a case that the station can obtain a MAC header, the station may set the MAC-level virtual carrier sensing. On the contrary, in a case that the station cannot obtain a MAC header, the station may set the PHY-level virtual carrier sensing. Since the received frame is an 11ax frame including a PHY header comprising information for setting a virtual carrier sensing, the station may set the PHY-level virtual carrier sensing without necessity of reading the MAC header for power saving.

If the received frame is an 11ax frame and a MyBSS frame, and the received signal strength of the received frame is higher than the CCA threshold for MyBSS, the station may not obtain a transmission opportunity, and may set a PHY-level virtual carrier sensing or a MAC-level virtual carrier sensing (A2 region). Since the received frame is an 11ax frame, the HE station may easily identify whether the received frame is a MyBSS frame based on the BSS color field of the PHY header. In a case that the station can obtain a MAC header, the station may set the MAC-level virtual carrier sensing. On the contrary, in a case that the station cannot obtain a MAC header, the station may set the PHY-level virtual carrier sensing. Since the received frame is an 11ax frame including a PHY header comprising information for setting a virtual carrier sensing, the station may set the PHY-level virtual carrier sensing without necessity of reading the MAC header for power saving.

If the received frame is an 11ax frame and an OBSS frame, and the received signal strength of the received frame is higher than the RX sensitivity and lower than the CCA threshold for OBSS, the station may try to obtain a transmission opportunity (B1 region). That is, the station may try to obtain a transmission opportunity based on a spatial reuse scheme.

If the received frame is an 11ax frame and an OBSS frame, and the received signal strength of the received frame is higher than the CCA threshold for OBSS, the station may not obtain a transmission opportunity, and may set a virtual carrier sensing (B2 region). Since the received frame is an 11ax frame including a PHY header comprising information for setting a virtual carrier sensing, the station may set the PHY-level virtual carrier sensing without necessity of reading the MAC header for power saving.

Even when the received frame is a legacy frame, if the received frame is identified as a MyBSS frame, and the received signal strength of the received frame is higher than the RX sensitivity and lower than the CCA threshold for MyBSS, the station may not obtain a transmission opportunity, and may set a MAC-level virtual carrier sensing (C1 region). Since the received frame is a legacy frame which does not include a PHY header comprising information for setting a virtual carrier sensing, the station may set the MAC-level virtual carrier sensing.

Even when the received frame is a legacy frame, if the received frame is identified as a MyBSS frame, and the received signal strength of the received frame is higher than the CCA threshold for MyBSS, the station may not obtain a transmission opportunity, and may set a PHY-level virtual carrier sensing or a MAC-level virtual carrier sensing (C2 region). Since the received frame is a legacy frame which does not include a PHY header comprising information for setting a virtual carrier sensing, the station may set the MAC-level virtual carrier sensing.

Even when the received frame is a legacy frame, if the received frame is identified as an OBSS frame, and the received signal strength of the received frame is higher than the RX sensitivity and lower than the CCA threshold for OBSS, the station may try to obtain a transmission opportunity (D1 region). That is, the station may try to obtain a transmission opportunity based on a spatial reuse scheme.

Even when the received frame is a legacy frame, if the received frame is identified as an OBSS frame, and the received signal strength of the received frame is higher than the CCA threshold for OBSS, the station may not obtain a transmission opportunity, and may set a virtual carrier sensing (D2 region). Since the received frame is a legacy frame which does not include a PHY header comprising information for setting a virtual carrier sensing, the station may set the MAC-level virtual carrier sensing.

If the station cannot identify whether the received frame is a MyBSS frame or an OBSS frame, and the received signal strength of the received frame is higher than the RX sensitivity and lower than the CCA threshold for MyBSS, the station cannot determine to set a virtual carrier sensing or to obtain a transmission opportunity for spatial reuse. Therefore, for this case, the station may set a temporary level virtual carrier sensing (E1 region). For example, the station may set a temporary duration for a virtual carrier sensing by using information (duration/ID field) of a MAC header in a MPDU. In this case, the temporary duration may be a temporary NAV. The temporary duration may be updated or reset based on information in a PHY header or a MAC header of a frame subsequent to the received frame. In an exemplary embodiment, when the station receives a frame such as a CTS frame, which cannot be identified as a MyBSS frame or an OBSS frame, the station may set a temporary duration for a virtual carrier sensing together with a MAC address of a receiving station. After then, if the station receives a subsequent frame having a MAC address identical to the MAC address which is set with the temporary duration, and the station can determine that the subsequent frame is a MyBSS frame since the subsequent frame belongs to regions A1, A2, B1, B2, C1, C2, D1, and D2, the station may set a PHY-level virtual carrier sensing or a MAC-level virtual carrier sensing. Also, if the station can identify that the subsequent frame is an OBSS frame, the station may reset the temporary duration, and obtain a transmission opportunity.

If the station cannot identify whether the received frame is a MyBSS frame or an OBSS frame, and the received signal strength of the received frame is higher than the CCA threshold for MyBSS, the station may set a virtual carrier sensing without necessity of identifying whether the received frame is a MyBSS frame or an OBSS frame (E2 region). Specifically, since a PHY header of a legacy frame does not include information (field) for setting a virtual carrier sensing, the station may set a MAC-level virtual carrier sensing.

While the example embodiments of the present disclosure and their advantages have been described in detail, it should be understood that various changes, substitutions and alterations may be made herein without departing from the scope of the disclosure.

What is claimed is:

1. A method for transmitting a frame, performed in a first station, the method comprising:
   receiving a first physical layer (PHY) protocol data unit (PPDU);
   determining whether a basic service set (BSS) of the first PPDU is a BSS to which the first station belongs or a BSS to which the first station does not belong;
   when the BSS of the first PPDU is the BSS to which the first station does not belong, a received signal strength of the first PPDU is higher than a first threshold, and the first PPDU is a frame having a mode that is High Efficiency and having a PHY header that includes duration information for setting a virtual carrier sensing, setting a PHY-level virtual carrier sensing, wherein setting the PHY-level virtual carrier sensing includes setting a virtual carrier sensing by using the duration information included in a the PHY header of the first PPDU;
   when the BSS of the first PPDU is the BSS to which the first station does not belong, the received signal strength of the first PPDU is higher than the first threshold, the first PPDU is a frame having a mode of a standard previous to a standard defining the High Efficiency mode, and the first PPDU is a frame having a PHY header that does not include duration information for setting the virtual carrier sensing, setting a medium access control (MAC)-level virtual carrier sensing, wherein setting the MAC-level virtual carrier sensing includes setting the virtual carrier sensing by using duration information included in a MAC header of the first PPDU; and
   when the BSS of the first PPDU is the BSS to which the first station does not belong and the received signal strength of the first PPDU is lower than the first threshold, attempting to obtain a transmission opportunity.

2. The method according to claim 1, further comprising, when the BSS of the first PPDU is the BSS to which the first station belongs, setting a virtual carrier sensing by using information included in the PHY header of the first PPDU.

3. The method according to claim 1, wherein the BSS of the first PPDU is determined based on at least one of a BSS identifier (BSSID), a transmitter address, a receiver address, and a version information included in the first PPDU.

4. The method according to claim 1, wherein the first threshold is a clear channel assessment (CCA) threshold.

5. The method according to claim 1, wherein the first threshold is different from a threshold which is used for determining reception possibility of the first PPDU when the BSS of the first PPDU is the BSS to which the first station belongs.

6. The method according to claim 1, wherein the information included in the PHY header of the first PPDU indicates a duration which is set for the virtual carrier sensing.

7. The method according to claim 1, wherein attempting to obtain the transmission priority is performed without setting of the virtual carrier sensing.

8. A station comprising:
   a processor; and
   a memory storing at least one instruction executed by the processor, to perform:
   receiving a first physical layer (PHY) protocol data unit (PPDU);
   determining whether a basic service set (BSS) of the first PPDU is a BSS to which the first station belongs or a BSS to which the first station does not belong;
   when the BSS of the first PPDU is the BSS to which the first station does not belong, a received signal strength of the first PPDU is higher than a first threshold, and the first PPDU is a frame having a mode that is High Efficiency and having a PHY header that includes duration information for setting a virtual carrier sensing, setting a PHY-level virtual carrier sensing, wherein setting the PHY-level virtual carrier sensing includes setting a virtual carrier sensing by using the duration information included in a PHY header of the first PPDU;
   when the BSS of the first PPDU is the BSS to which the first station does not belong, the received signal strength of the first PPDU is higher than the first threshold, the first PPDU is a frame having a mode of a standard previous to a standard defining the High Efficiency mode, and the first PPDU is a frame having a PHY header that does not include duration information for setting the virtual carrier sensing, setting a medium access control (MAC)-level virtual carrier sensing, wherein setting the MAC-level virtual carrier sensing includes setting the virtual carrier sensing by using duration information included in a MAC header of the first PPDU; and
   when the BSS of the first PPDU is the BSS to which the first station does not belong and the received signal strength of the first PPDU is lower than the first threshold, attempting to obtain a transmission opportunity.

9. The station according to claim 8, wherein the at least one instruction further executes, when the BSS of the first PPDU is the BSS to which the first station belongs, setting the virtual carrier sensing by using information included in the PHY header of the first PPDU.

10. The station according to claim 8, wherein the BSS of the first PPDU is determined based on at least one of a BSS identifier (BSSID), a transmitter address, a receiver address, and a version information included in the first PPDU.

11. The station according to claim 8, wherein the first threshold is a clear channel assessment (CCA) threshold.

12. The station according to claim 8, wherein the first threshold is different from a threshold which is used for determining reception possibility of the first PPDU when the BSS of the first PPDU is the BSS to which the first station belongs.

13. The station according to claim 8, wherein the information included in the PHY header of the first PPDU indicates a duration which is set for the virtual carrier sensing.

14. The station according to claim 8, wherein attempting to obtain the transmission priority is performed without set of the virtual carrier sensing.

* * * * *

UNITED STATES PATENT AND TRADEMARK OFFICE
CERTIFICATE OF CORRECTION

PATENT NO. : 9,848,442 B2
APPLICATION NO. : 14/937284
DATED : December 19, 2017
INVENTOR(S) : Yongjin Kwon and Hyungu Park Page 1 of 1

It is certified that error appears in the above-identified patent and that said Letters Patent is hereby corrected as shown below:

In the Claims

Column 16 Line 24 In Claim 7, replace the term "priority" with the term "opportunity" and remove the word "of"

Column 17 Line 18 In Claim 14, replace the term "priority" with the term "opportunity" and replace the term "set of" with the term "setting"

Signed and Sealed this
Twenty-ninth Day of November, 2022

Katherine Kelly Vidal
*Director of the United States Patent and Trademark Office*